United States Patent Office 3,045,036
Patented July 17, 1962

3,045,036
END-BLOCKED AMINOALKYLPOLYSILOXANES AND PROCESS FOR CYCLIC AMINOALKYL-SILOXANES
Victor B. Jex, Kenmore, and Donald L. Bailey, Snyder, N.Y., assignors to Union Carbide Corporation, a corporation of New York
No Drawing. Filed Nov. 18, 1957, Ser. No. 696,931
5 Claims. (Cl. 260—448.2)

This invention relates in general to the synthesis of organosilicon compounds. More particularly, the invention is concerned with aqueous admixtures of organosilicon compounds, which contain alkoxy groups bonded to the silicon atom thereof and which also contain an amine functional group linked to the same silicon atom through at least three carbon atoms of a divalent alkane group, as new compositions of matter. The invention further contemplates the provision of novel classes of organopolysiloxanes derived from the aqueous admixtures referred to above and to processes for their production.

The present invention is based, in part, upon our discovery that certain alkoxysilanes, namely dialkoxysilanes, which contain an amino functional group linked to the silicon atom thereof through at least three carbon atoms of a divalent alkane group are miscible with aqueous mediums and form stable admixtures therewith. The present invention is also based, in part, upon our discovery that such dialkoxysilanes when admixed with an aqueous medium hydrolyze at a slow rate and subsequently condense to form mixtures of water-miscible organopolysiloxanes from which mixtures, novel types of organopolysiloxanes can be recovered.

The dialkoxysilanes suitable for use in preparing aqueous admixtures of the present invention are the aminoalkyldialkoxysilanes which can be depicted by the structural formula:

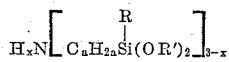

wherein R represents an alkyl or an aryl group, but is preferably an alkyl group, R' represents an alkyl group, $a$ is a number having a value of at least 3 and preferably a value of from 3 to 9, and $x$ is a number having a value of from 0 to 2. Illustrative of the alkyl groups which R and R' can represent are methyl, ethyl, propyl, and the like while typical of the aryl groups which R can represent are phenyl, naphthyl, tolyl, and the like. Dialkoxysilanes falling within the above structural formula are disclosed and claimed in our copending U.S. application Serial No. 615,466, filed October 12, 1956, now United States Patent 2,930,809, and include such compounds as:

Diethoxymethylsilylpropylamine (gamma-aminopropyl-methyldiethoxysilane)
Dipropoxyethylsilylpropylamine (gamma-aminopropyl-ethylpropoxysilane)
Diethoxyethylsilylpropylamine (gamma-aminopropylethyl-diethoxysilane)
Diethoxyphenylsilylpropylamine (gamma-aminopropyl-phenylethoxysilane)
Diethoxymethylsilylbutylamine (delta-aminobutylmethyl-diethoxysilane)
Dipropoxyethylsilylbutylamine (delta-aminobutylethyldi-propoxysilane)
Diethoxyethylsilylbutylamine (delta-aminobutylethyldi-ethoxysilane)
Diethoxyphenylsilylbutylamine (delta-aminobutylphenyl-diethoxysilane)
Diethoxymethylsilylisobutylamine (gamma-aminoisobutyl-methyldiethoxysilane), and the like In the practice of our invention, the aqueous admixtures thereof can be prepared by forming a mixture of an aminoalkyldialkoxysilane, in which the amino group is linked to the silicon atom thereof through at least three carbon atoms of a divalent alkane group with an aqueous medium such as water or mixtures of water and a water-miscible liquid organic compound suitable for use as one component of an aqueous medium are: the alkanols such as ethanol, propanol, butanol, and the like and the water-miscible ethers such as tetrahydrofuran and dioxane.

In preparing our aqueous admixtures, the amount of water present in the aqueous medium is critical, but can vary over a wide range. We employ at least one mole of water per mole of the aminoalkyldialkoxysilane and prefer to employ from 10 up to 100 and more moles of water per mole of the aminoalkylalkoxysilane. The amount of a water-miscible liquid organic compound present in such aqueous mediums varies in accordance with the amount of water employed. We can employ such compounds in an amount which can vary from zero parts up to its upper limit of solubility in water. When such liquid organic compounds are miscible with water in all proportions, we can employ an amount thereof which varies from 40 to 60 parts of one to 60 to 40 parts of the other.

The aqueous admixtures of the present invention are stable compositions of matter forming solutions which find use as a size or finish for inorganic oxide fillers employed in combination with thermosetting resins to produce composite articles. Such is disclosed and claimed in our copending U.S. application Serial No. 483,423, filed January 21, 1955, now abandoned, and our copending U.S. application Serial No. 615,482, filed October 12, 1956. As is also disclosed and claimed in said above-identified copending applications, our aqueous admixtures can also be employed to modify thermosetting resins, particularly such thermosetting resins as the aldehyde condensation resin, and the urethane resins to permit their use in combination with non-sized glass cloth. Such solutions can also be employed as coatings for other organic and inorganic materials.

According to our experience, the aminoalkyldialkoxysilanes which we employ to prepare our aqueous admixtures hydrolyze at a slow rate when dissolved in aqueous mediums and so condense to form a hydrolyzate comprising a specific variety of aminoalkylpolysiloxanes which remain in solution. By concentrating such hydrolyzates or solutions, we have found that the aminoalkylpolysiloxanes dissolved therein can be recovered in a form comprising, for the most part, a mixture of essentially linear mono-hydroxy or mono-alkoxy end-blocked aminoalkyl-polysiloxanes.

In the practice of this embodiment of our invention, a hydrolyzate is prepared by forming a mixture of an aminoalkylalkyldialkoxysilane or an aminoalkylaryldialkoxysilane with water or with a mixture of water and a water-miscible liquid organic compound, comparable to that described above, permitting the admixture to stand for a period of from about ten to about fifteen minutes or more to permit the dialkoxysilane to hydrolyze and form a homogeneous hydrolyzate and concentrating the hydrolyzate by means which removes water (if any is present), the liquid organic compound (if any is employed), and the alkanol by-product of the process. There results or is produced a concentrated hydrolyzate comprising a mixture of essentially linear mono-hydroxy or mono-alkoxy end-blocked aminoalkylalkylpolysiloxanes or aminoalkyl-arylpolysiloxanes.

We prefer to prepare our hydrolyzates by forming a mixture of an aminoalkyldialkoxysilane and water in an amount of at least one mole of water per mole of the aminoalkyldialkoxysilane. We have employed, with good results, from about two to about six moles of water per mole of the aminoalkyldialkoxysilane and therefore such amounts are most preferred.

The polymerization or hydrolysis of our aminoalkyldialkoxysilane starting materials apparently commences upon contact of the dialkoxysilanes with water and proceeds at a slow rate. The hydrolysis reaction is mildly exothermic as some heat is evolved. However, if the amount of water employed to prepare our hydrolyzate is more than about 10 moles per mole of the dialkoxysilane, the heat of the reaction is not apparent. When employing water in an amount within our preferred range, we have found that the temperature of the reaction mixture can vary from about 20° C. up to about 50° C.

Our mono-hydroxy or mono-alkoxy end-blocked aminoalkylalkylpolysiloxanes or aminoalkylarylpolysiloxanes can be recovered from such hydrolyzates by means which include vacuum distillation of the alkanol product of the reaction as well as the excess water, if present. Such distillation is conducted at temperatures which are no higher than about 200° C. under reduced presure of from 1 to 5 mm. Hg, or at temperatures comparable thereto under other pressure conditions. The product remaining after the vacuum distillation procedure comprises a mixture of mono-hydroxy or mono-alkoxy end-blocked aminoalkylpolysiloxane oils, of various molecular weights, and having an average degree of polymerization of from about 15 to about 35. That is, each polymeric chain contains on the average of from about 15 to about 30 aminoalkylalkylsiloxane or aminoalkylarylsiloxane units.

The hydrolyzates of our invention which comprise mixtures of end-blocked aminoalkylpolysiloxanes can be graphically depicted by the formula:

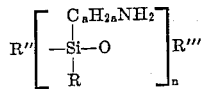

wherein R″ represents either a hydroxy group or an alkoxy group, R‴ represents either a hydrogen atom or an alkyl group, R represents either an alkyl or aryl group, $a$ is a number having a value of at least 3, preferably from 3 to 9, and $n$ is a number having an average value of from 15 to about 35. Such end-blocked aminoalkylpolysiloxanes find use without further synthesis as lubricating oils and moreover can be employed directly in the production of modified dimethylpolysiloxane oils containing aminoalkylalkylsiloxane or aminoalkylarylsiloxane units. The use of such hydrolyzates in the production of modified dimethylpolysiloxane oils as well as the modified oils themselves are disclosed and claimed in copending U.S. application Serial No. 615,507, filed October 12, 1956, now United States Patent 2,947,771.

The preferred hydrolyzates of our invention are those mixtures of end-blocked aminoalkylpolysiloxanes represented by the above structural formula wherein: $a$ has a value of 3 or 4, R represents an alkyl group, most preferably a methyl group, and $n$ has an average value of from 20 to about 30. Hydrolyzates of this preferred type contain gamma-aminopropylmethylsiloxane units and delta-aminobutylmethylsiloxane units and can be defined in addition to their average degree of polymerization by their refractive index. By way of illustration, our preferred hydrolyzates containing hydroxy or alkoxy end-blocked gamma-aminopropylsiloxanes having an average degree of polymerization from about 20 to about 30 have a refractive index at 25° C. in the range of from about 1.4758 to about 1.4762, whereas the corresponding delta-aminobutylpolysiloxane hydrolyzates have a refractive index at 25° C. in the range of from about 1.4719 to about 1.4729. The hydrolyzates of our invention are clear, viscous, colorless oils.

Our hydrolyzates contain, as described above, hydroxy or alkoxy groups as the polymer end-blocking groups. The polymeric chains comprising the hydrolyzate can have either one alkoxy or one hydroxy group bonded to each of the terminal silicon atoms thereof or they can have one hydroxy group bonded to one of the terminal silicon atoms and an alkoxy group bonded to the other terminal silicon atom.

The mechanism of the overall hydrolysis of our aminoalkyldialkoxysilane starting materials to form the defined hydrolyzates of the invention is not known or clearly understood. The use of compounds such as sodium or potassium hydroxide or their corresponding silanolate derivatives, known to be catalysts for the hydrolysis and/or condensation of other hydrocarbon-substituted alkoxysilanes to hydrolyzates, appears to have little, if any, effect on either the course or rate of hydrolysis. In addition, the use of water-miscible as well as water-immiscible liquid organic compounds, as for example, diethyl ether and benzene, also appear to have no effect on either the course or rate of the reaction. One possible explanation for the mechanism of our reaction which yields well-defined hydrolyzates useful in many synthesis, without further purification or rearrangement as is common practice with the hydrolyzates of the hydrocarbon substituted alkoxysilanes, is that apparently the reaction mixture, when in equilibrium contains sufficient hydroxy and/or alkoxy groups, which limit the growth of the polymeric chains comprising the hydrolyzate.

The present invention is further based upon our discovery that when our hydrolyzates are heated to temperatures above about 200° C. under a reduced pressure of from 1 to 5 mm. Hg or under comparable conditions of temperature and pressure (i.e. lower temperatures and lower pressures) the mixtures of essentially linear end-blocked aminoalkylpolysiloxanes rearrange and form cyclic aminoalkylpolysiloxanes which can be distilled from the remaining product of such rearrangement. More specifically, we have found that cyclic aminoalkylalkylsiloxanes and aminoalkylarylsiloxanes ranging from the trimer up to the heptamer and higher can be obtained either separately or as mixtures of cyclic siloxanes by heating the hydrolyzates described above to a temperature of at least about 200° C. under a reduced pressure of from 1 to 5 mm. Hg or under conditions of comparable temperature and pressure, and that such cyclic siloxanes or mixtures of such cyclic siloxanes can be recovered from the by-products of the rearrangement by distillation procedures.

Our cyclic aminoalkylsiloxanes of this invention can be graphically depicted by the formula:

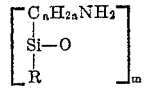

wherein R and $a$ have the values previously defined and $m$ is a number having a value of from three to seven. Typical of our cyclic siloxanes are the cyclic trimer, tetramer, and pentamer of gamma-aminopropylmethylsiloxane, the cyclic trimer, tetramer, and pentamer of delta-aminobutylmethylsiloxane, as well as the corresponding cyclic compounds of gamma-aminobutylphenylsiloxane. These and the other cyclic aminoalkylsiloxanes of the above generic formula are clear, viscous, colorless oils. Such cyclic siloxanes can, as the hydrolyzates from which they are prepared, be employed in the production of dimethylpolysiloxane oils containing aminoalkylalkylsiloxane or aminoalkylarylsiloxane units as disclosed in our copending U.S. application Serial No. 615,-507, filed October 12, 1956, now United States Patent 2,947,771. The cyclic siloxanes can also be employed as sizes for fibrous glass materials employed in combination with thermosetting resins.

The use of sodium or potassium hydroxide or their silanolate salts as well as the use of solvents appears to have little, if any, effect on the course or rate of the rearrangement reaction.

Mono-hydroxy or mono-alkoxy end-blocked linear aminoalkylalkylpolysiloxanes and aminoalkylarylpolysiloxanes having a more uniform chain length (i.e. more uniform degree of polymerization) and which chain lengths can vary over a wider range than those obtained by the hydrolysis method described above, can be obtained by the coequilibration of one or more cyclic aminoalkylsiloxanes with an aminoalkylalkyldialkoxysilane or with an aminoalkylaryldialkoxysilane or with water. The alkoxy end-blocked polysiloxanes can be prepared by heating a mixture comprising one or more cyclic siloxanes with an aminoalkyldialkoxysilane, in the presence of an alkali metal, to a temperature at which equilibration or a rearrangement of the starting materials occurs. The hydroxy end-blocked polysiloxanes can be prepared by heating the same cyclic siloxanes with water to a temperature at which a rearrangement or equilibration of the starting material occurs. In the latter process the use of an alkali metal catalyst is not particularly necessary.

The relative amounts of our starting materials for the coequilibration reaction of our process is not narrowly critical and can vary over a wide range depending upon the degree of polymerization desired in the resulting polymer. By way of illustration, the higher the degree of polymerization desired in the product, that is, the larger the polymer chain length, the greater the proportion or ratio of cyclic siloxane starting material to the dialkoxysilane or water starting material. Conversely, the lesser the degree of polymerization desired, the smaller the proportion of cyclic siloxane starting material to the dialkoxysilane or water starting material. By way of illustration, we can prepare through this embodiment of our invention, by varying the relative proportions of our starting materials, mono-hydroxy, or mono-alkoxy end-blocked polysiloxanes having a degree of polymerization from as low as about 5 up to as high as 1000 or more. That is, such polymers can contain from about 5 to 1000 and more aminoalkylsiloxane units per molecule. Such mono-hydroxy and mono-alkoxy end-blocked polysiloxanes vary from relatively low molecular weight aminoalkylpolysiloxane oils to higher molecular weight gums.

We can carry out the coequilibration process at temperatures in the range of from about 120° C. up to about 200° C. and higher. However, we prefer to conduct the coequilibration reaction at temperatures of from about 150° C. to about 200° C.

The alkali metal catalysts which we can employ in our coequilibration reaction to prepare alkoxy end-blocked aminoalkylpolysiloxanes include sodium and potassium hydroxide as well as their corresponding silanolate derivatives. Such catalysts can be employed in an amount of from about 20 to about 75 parts of alkali metal per million parts of the starting materials.

Our aminoalkylsiloxanes also include the mono-alkoxy or mono-hydroxy end-blocked linear copolymers and cyclic copolymers which contain in addition to the aminoalkylsiloxane units,

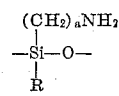

the difunctional dihydrocarbylsiloxane units of the formula:

wherein R° is hydrocarbyl, such as, alkyl or aryl and R and *a* are as previously defined. Also contemplated as included in our invention are hydroxy- or alkoxy-containing copolymers of aminoalkylsiloxane units as shown above and trifunctional monohydrocarbylsiloxane units of the formula:

where R° is as defined above. The copolymers can also contain difunctional dihydrocarbylsiloxane units as shown above, and trifunctional monohydrocarbyl units as shown above in addition to the aminoalkylsiloxane units and silicon bonded hydroxy or alkoxy groups. Combined monofunctional trihydrocarbylsiloxane units, R°₃SiO, are also present in certain of our copolymers. An advantageous method for making these hydroxy- and alkoxy-containing copolymers and cyclic copolymers is to equilibrate the aminoalkylpolysiloxanes herein described with the hydrocarbylsiloxanes, either cyclics or linears, which are well known in the art, as for example, dimethylsiloxanes, methylphenylsiloxanes, and the like, in the presence of an equilibrating catalyst such as potassium silanolate and the like. Equilibration methods of this type are well known to those skilled in the art.

The hydrolyzates, the cyclic aminoalkylsiloxanes as well as the coequilibrated polysiloxanes of the present invention can be reacted with aldehyde-condensation resins, urethane resins, and polyamide resins. Such copolymers can be prepared by forming a mixture of our aminoalkylpolysiloxanes with one or more of such resins, with or without the presence of a solvent and heating the mixture to a temperature sufficiently elevated to cause the starting materials to react. The reaction occurs between the amino group of our polysiloxanes and the reactive groups present on the organic polymers, as for example, the methylol, and isocyanate groups which respectively characterize the aldehyde condensation resins, and the urethane resins.

Of particular interest at present are the aldehyde condensation resins which are prepared by the reaction of an aldehyde or of a compound capable upon reaction to yield an aldehyde such as hexamethylenetetramine, with an organic compound to produce methylol containing derivatives which may be partially condensed to resinous materials: Examples of such aldehyde condensation resins include: the phenol-formaldehyde resins, the phenol-acetaldehyde resins, the phenol-furfural resins, the cresol-formaldehyde resins, the urea-formaldehyde resins, the melamine-formaldehyde resins and the like.

The following examples are illustrative of the present invention:

EXAMPLE 1

*The Preparation of a Hydrolyzate of Delta-Aminobutyl-methylpolysiloxane and Cyclic Delta-Aminobutylsiloxanes*

To a 200 ml. distillation flask was added 0.39 moles (80.2 grams) of delta-aminobutylmethyldiethoxysilane, and while agitating the contents of the flask, 1.17 moles (21.0 grams) of water was added thereto. The temperature of the reaction mixture, which was a homogeneous, clear and water-white liquid, rose to 44° C. After permitting the reaction mixture to stand for a period of about 15 minutes, ethanol and water were stripped therefrom by heating the mixture to a temperature of about 125° C. The reaction mixture was then heated to a temperature of about 200° C. under a reduced pressure of from 1 to 5 mm. Hg to remove the last traces of water and ethanol therefrom. The product (45.2 grams), a delta-aminobutylmethylpolysiloxane hydrolyzate, was a viscous, colorless liquid. Analysis of the product indicated a mixture of essentially linear mono-hydroxy, mono-ethoxy and mixed, mono-hydroxy and mono-ethoxy end-blocked delta-aminobutylpolysiloxanes, having an average degree of polymerization of 18 and an average molecular weight of 2320. The hydrolyzate has a refractive index at 25° C. of 1.4719.

The hydrolyzate was then placed in a flask connected to a distillation column and heated to an elevated temperature under reduced pressure to cause redistribution of the polymer chains comprising the hydrolyzate and to distill cyclic delta-aminobutylmethylsiloxanes. Four fractions were obtained, each of which contain cyclic delta-aminobutylmethylsiloxanes. The table of the distillation procedure appears below:

TABLE 1

| Take off Temp. (° C.) | Take off Pressure (mm. Hg) | Wt., g. | $n_D^{25}$ Within 2 Hrs. After Distillation | Percent C | Percent H | Percent Si | Percent N |
|---|---|---|---|---|---|---|---|
| 1. ca 200–225 | 1.6–1.5 | 4.9 | 1.4586 | 47.9 | 9.4 | 19.8 | 9.8 |
| 2. 225–235 | 1.5 | 9.8 | 1.4674 | 46.0 | 10.1 | 21.0 | 10.5 |
| 3. 235–280 | 1.4–0.8 | 10.1 | 1.4679 | 44.7 | 9.2 | 21.3 | 10.5 |
| 4. 230–235 | 1.0–1.4 | 13.0 | 1.4678 | 46.0 | 10.1 | 21.4 | 10.5 |

Calculated for $C_5H_{13}ONSi$: C, 45.8; H, 9.9; Si, 21.4; N, 10.7. Infrared analysis of the products indicated that each of the fractions contained large quantities of the cyclic tetramer of delta-aminobutylmethylsiloxane as well as smaller amounts of the cyclic trimer and the cyclic pentamer thereof.

The cyclic aminobutylmethylpolysiloxanes obtained are stable compositions of matter showing little or no change after storage for periods up to 54 and more days.

EXAMPLE 2

*The Cyclic Tetramer of Delta-Aminobutylmethylsiloxane*

In a prdocedure similar to that disclosed in Example 1, by heating the resulting hydrolyzate to a temperature of from 240 to 244° C. under a reduced pressure of 0.5 mm. Hg, the cyclic tetramer of delta-aminobutylmethylsiloxane was obtained. This compound has a refractive index at 25° C. of 1.4689.

EXAMPLE 3

*The Preparation of a Hydrolyzate of Gamma-Aminopropylmethylpolysiloxane and Cyclic Gamma-Aminopropylsiloxanes*

To a 200 ml. distillation flask was added 0.37 mole (70.7 grams) of gamma-aminopropylmethyldiethoxysilane and while agitating the contents of the flask 1.0 mole (18 grams) of water was added thereto. The temperature of the reaction mixture, which was a homogeneous clear and water white liquid, rose to 38° C. After permitting the reaction mixture to stand for a period of about 10 minutes, ethanol and water were stripped therefrom by heating the mixture to a temperature of about 130° C. The reaction mixture was then heated to a temperature of about 200° C. under a reduced pressure of about 1 to 5 mm. Hg to remove the last traces of water and ethanol therefrom. The product (41.3 grams), a gamma-aminopropylmethylpolysiloxane hydrolyzate was a viscous, colorless liquid. Analysis of the product disclosed its composition as a mixture of mono-ethoxy, mono-hydroxy, and mixed mono-ethoxy, and mono-hydroxy end-blocked gamma aminopropylmethylpolysiloxanes having an average degree of polymerization of 23 and a molecular weight of 2740. The hydrolyzate has a refractive index at 25° C. of 1.4751.

The hydrolyzate was then placed in a flask connected to a distillation column and heated to an elevated temperature under a reduced pressure to cause redistribution of the polymer chains comprising the hydrolyzate and to distill cyclic gamma-aminopropylmethylsiloxanes therefrom. Three fractions were obtained, each of which contain cyclic gamma-aminopropylmethylsiloxanes. The table of the distillation procedure appears below:

TABLE 2

| Take off Temp. (° C.) | Take off Pressure (mm. Hg) | Wt., g. | $n_D^{25}$ Within 2 Hrs. After Distillation | Percent C | Percent H | Percent Si | Percent N |
|---|---|---|---|---|---|---|---|
| 170–181 | 0.4 | 4.9 | 1.4689 | 38.7 | 9.0 | 23.2 | 11.6 |
| 181–224 | 0.4–0.7 | 8.2 | 1.4701 | 41.3 | 10.2 | 23.8 | 11.6 |
| 224–230 | 0.8 | 19.5 | 1.4702 | 43.9 | 7.3 | 23.7 | 11.4 |

Calculated for $C_4H_{11}ONSi$: C, 41.0; H, 9.4; Si, 24.0; N, 11.9. Infrared analysis of the product indicated that each of the fractions contained large amounts of the cyclic tetramer of gamma-aminopropylmethylsiloxane as well as smaller amounts of the cyclic trimer and the cyclic pentamer thereof.

EXAMPLE 4

To a 200 ml. distillation flask was added 0.24 mole (45.6 grams) of gamma-aminopropylmethyldiethoxysilane and while agitating the contents of the flask 0.64 mole (11.6 grams) of water was added thereto. The reaction mixture comprised a homogeneous, clear and water white liquid. After permitting the reaction mixture to stand for several minutes, ethanol and water were stripped therefrom by heating the mixture to a temperature of about 160° C. The reaction mixture was then heated to a temperature of about 200° C. under a reduced pressure of from 1 to 5 mm. Hg to remove the last traces of water and ethanol therefrom. The product, a gamma-aminopropylmethylpolysiloxane hydrolyzate was a viscous, colorless liquid having a refractive index at 25° C. of 1.4759. Analysis of the product disclosed its composition as a mixture of mono-ethoxy, mono-hydroxy and mixed mono-hydroxy and mono-alkoxy end-blocked gamma-aminopropylmethylpolysiloxanes having an average degree of polymerization of from about 20 to about 30.

The hydrolyzate was then placed in a flask connected to a distillation column and heated to an elevated temperature under reduced pressure to cause redistribution of the polymeric chains comprising the hydrolyzate and to distill cyclic gamma-aminopropylmethylsiloxanes. Fractions comprising a mixture of the cyclic trimer and cyclic tetramer of gamma-aminopropylmethylsiloxane were obtained at a temperature of 190–244° C. under a reduced pressure of 0.5–0.7 mm. Hg. The presence of the cyclic trimer and tetramer was determined by infrared analysis.

EXAMPLE 5

To a 1 liter flask was added 1.35 moles (315 grams) of delta-aminobutylmethyldiethoxysilane and while agitating the contents of the flask 4.60 moles (83 grams) of water was added. The reaction mixture comprised a homogeneous, clear and water white liquid. After permitting this reaction mixture to stand for 10 minutes, ethanol and water were stripped therefrom by heating the mixture to a temperature of about 225° C. under atmospheric pressure. The reaction mixture was then heated to a temperature of about 200° C. under a reduced pressure of 1–5 mm. Hg to remove the last traces of water and ethanol therefrom. The product, a delta-aminobutylmethylpolysiloxane hydrolyzate, was a viscous, colorless liquid having a refractive index at 25° C. of 1.4721. Analysis of the product disclosed its composition as a mixture of mono-ethoxy and mono-hydroxy end-blocked aminobutylmethylpolysiloxanes having an average degree of polymerization of from about 20 to 30.

The hydrolyzate was then placed in a flask connected to a distillation column and heated to an elevated temperature under a reduced pressure to cause redistribution of the polymer chains present in the hydrolyzate and to distill cyclic delta-aminobutylmethylsiloxanes therefrom. A fraction was obtained over the boiling range of from about 208 to 285° C. under a reduced pressure of 0.9 to 1.5 mm. Hg. The fraction was a clear water white liquid and contained a mixture of cyclic delta-aminobutylmethylsiloxanes ranging from the trimer to the hexamer (mostly tetramer as indicated by infrared analysis).

We have found that hydroxy end-blocked aminoalkylalkylpolysiloxanes and aminoalkylarylpolysiloxanes can be prepared by forming a mixture of a dialkoxysilane with water preferably in an amount of from about ten or more moles of water per mole of the dialkoxysilane and maintaining the mixture below a temperature of about 20° C. as for example at a temperature of from about 0° C. to about 10° C. and subsequently stripping the water and alkanol by-product from the mixture. The concentrated hydrolyzate comprised only hydroxy end-blocked aminoalkylpolysiloxanes. The following example is illustrative.

EXAMPLE 6

To a 500 cc. flask equipped with a stirrer was added 0.5 mole (102.7 grams) of delta-aminobutylmethyldiethoxysilane and the flask placed in an ice bath having a temperature of from about 0 to 5° C. While stirring the silane, 3 moles (54 grams) of water was added thereto. The mixture was stirred for a period of 1½ hours after which water and the alkanol by-product stripped therefrom. The concentrated hydrolyzate comprised a mixture of hydroxy end-blocked delta-aminobutylmethylpolysiloxanes having an average degree of polymerization of from about 20 to about 30.

EXAMPLE 7

The use of the cyclic aminoalkylsiloxanes as disinfectants was illustrated by the following test.

A standard method for measuring the disinfectant power of chemical compounds is the phenol coefficient test. The phenol coefficient is a term that expresses the germicidal action of a chemical agent toward a test organism at a given temperature in terms of the action of phenol under identical conditions. For example, a phenol coefficient of 25 means that the agent tested is 25 times as effective as phenol under the specified conditions.

Two cyclic siloxane mixtures were screened for disinfectant activity under the following conditions.

Procedure: Association Official Agricultural Chemists
Organism: *Eberthella typhosa*
Temperature: 20° C.
Results:

| Agent | Phenol Coefficient |
| --- | --- |
| 1. Gamma-aminopropylmethyl cyclic siloxanes | Greater than 25. |
| 2. Delta-aminobutylmethyl cyclic siloxanes | Do. |

The above results indicate that both mixtures of cyclic siloxanes possess disinfectant activity. The coefficients were found to be greater than 25; further testing was not carried out to determine the maximum figure. However, on the basis of these data, the mixture may be recommended as disinfectants.

EXAMPLE 8

*Preparation of Ethoxy-Endblocked Delta-Aminobutylmethylpolysiloxane Oils of M.W. 1,000, 5,000 and 10,000 by Reaction of Delta-Aminobutylmethyldiethoxysilane With Delta-Aminobutylmethyl Mixed Cyclic Silicones*

To a test tube was added delta-aminobutylmethyl mixed cyclic silicones (31.8 grams, 0.242 mole) and delta-aminobutylmethyldiethoxysilane (8.2 grams, 0.04 mole). This quantity of diethoxysilane used is the calculated amount for the preparation of a 1,000 M.W. ethoxy-endblocked oil (containing 7 aminobutylmethylsiloxane units). To a second test tube was added delta-aminobutylmethyl mixed cyclic silicones (38.4 grams, 0.292 mole) and delta-aminobutylmethyldiethoxysilane (1.64 grams, 0.008 mole). These are the calculated quantities for the preparation of a 5,000 M.W. ethoxy-endblocked oil (containing 38 aminobutylmethylsiloxane units). To a third test tube was added delta-aminobutylmethyl mixed cyclic silicones (39.2 grams, 0.299 mole) and delta-aminobutylmethyldiethoxysilane (0.82 gram, 0.004 mole). These are the calculated quantities for the preparation of a 10,000 M.W. ethoxy-endblocked oil (containing 76 aminobutylmethylsiloxane units). The three tubes were placed in an oil bath at 158° C. and potassium silanolate catalyst (100 p.p.m. K) stirred into the hot solutions. The reaction mixtures were protected at all times by argon. They were allowed to remain in the bath for 20 hours, then they were cooled and viscosities of each was determined on a Brookfield viscometer:

| Calculated Molecular Weight | Viscosity (cps.) | Appearance |
| --- | --- | --- |
| 1,000 | 78 | Pale yellow. |
| 5,000 | 486 | Colorless. |
| 10,000 | 837 | Do. |

EXAMPLE 9

A No. 181 glass cloth which had previously been subjected to heat cleansing was immersed in a solution consisting of equal parts by weight of water and ethanol and containing 1.2 percent by weight of gamma-aminopropylmethyldiethoxysilane. A second piece of heat cleansed cloth was immersed in a solution also consisting of equal parts by weight of water and ethanol and containing 1.2 percent by weight of delta-aminobutylmethyldiethoxysilane. After removal from their respective solutions, the glass cloths were dried and laminates (13 ply) were prepared from such cloths in combination with a commercial melamine-aldehyde condensation polymer ("Melmac-405," a melamine resin sold by the American Cyanamid Company), which resin was employed as a solution containing 50 percent solids by weight and a solvent consisting of 95 parts of water and 5 parts butanol. The laminates thus laid up were precured at a temperature of about 125° C. for a period of about 5 minutes in accordance with the manufacturer's recommendations. They were then subjected to a final curing treatment at a temperature of 150° C. for a period of about 10 minutes in a hydraulic press at a pressure of 1000 pounds per square inch. The laminates were tested for flexural strength in accordance with Air Force specification MILP-803 and the date (average values for four laminates) obtained and listed below and compared with the corresponding values for laminates prepared in the same manner with unsized glass cloth:

TABLE.—FLEXURAL STRENGTH

| | Dry, p.s.i. | Wet, p.s.i. | Percent Retention |
| --- | --- | --- | --- |
| Non-sized glass cloth laminate | 28,400 | 13,900 | 56.5 |
| Sized glass cloth laminate (glass cloth treated with a solution of delta-aminobutylmethyldiethoxysilane) | 85,375 | 76,875 | 90 |
| Sized glass cloth laminate (glass cloth treated with a solution of gamma-aminopropylmethyldiethoxysilane) | 77,875 | 73,000 | 94 |

EXAMPLE 10

Copolymers of aminopropylmethylpolysiloxanes and phenol-formaldehyde condensation resins can be prepared by forming mixtures of either cyclic aminopropylmethylsiloxanes or hydroxy or alkoxy end-blocked aminopropylmethylpolysiloxanes with a phenol-formaldehyde condensation resin (not completely cured) in an amount of from 10 to 90 parts of one to 90 to 10 parts of the other, and heating the mixture, with or without the presence of a solvent to a temperature at which a copolymer is produced through the reaction of the amino groups of the polysiloxane with the methylol groups of the condensation resin. There results copolymers useful as coatings for metal surfaces.

The copolymers of the invention in addition to their use as coatings can also be employed with fibrous glass materials to prepare reinforced plastics.

EXAMPLE 11

In a 50 millimeter flask there were placed 20 grams of gamma-aminoisobutylmethyldiethoxysilane and 18 cubic centimeters of distilled water. The reaction mixture thus formed comprised a homogeneous, clear water white liquid. A short Vigreaux column was attached to the flask and heat applied over a period of one hour to drive off the excess water and ethanol formed. During heating, the temperature of the reaction mixture rose to 150° C. At this point, the reaction mixture was stripped at 150° C. under reduced pressure to remove traces of water and ethanol present. There was obtained 12 grams of fluid gamma-aminoisobutylmethyldiethoxysilane hydrolyzate containing residual hydroxyl groups.

The present application is a continuation-in-part application of our application Serial No. 615,481, filed October 12, 1956, now abandoned.

What is claimed is:

1. An alkoxy end-blocked aminoalkylpolysiloxane consisting essentially of the repeating unit:

wherein R is a member selected from the group consisting of alkyl and aryl groups, $a$ has a value of at least 3, and wherein the amino group is removed from silicon by at least 3 carbon atoms.

2. An ethoxy end-blocked delta-aminobutylmethylpolysiloxane oil consisting essentially of an average of from about 7 to about 76 delta-aminobutylmethylsiloxy units.

3. A process for preparing a cyclic aminoalkylpolysiloxane having the formula:

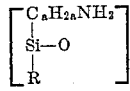

wherein R is a member selected from the group consisting of alkyl and aryl groups, $m$ has a value of from 3 to 7, $a$ has a value of at least 3, and wherein the amino group is removed from silicon by at least 3 carbon atoms, which comprises heating a hydrolyzate of an aminoalkyldialkoxysilane comprising a mixture of alkoxy and hydroxy end-blocked aminoalkylpolysiloxanes containing the repeating unit:

wherein $a$ and R have the same values defined above and wherein the amino group is removed from silicon by at least 3 carbon atoms, to a temperature sufficiently elevated to cause rearrangement of the aminoalkylsiloxane units present in said hydrolyzate and recovering said cyclic aminoalkylsiloxane as a distillate.

4. A process for preparing cyclic gamma-aminopropylmethylsiloxanes which comprises heating a hydrolyzate of gamma-aminopropylmethyldiethoxysilane comprising a mixture of ethoxy and hydroxy end-blocked gamma-aminopropylmethylpolysiloxanes to a temperature sufficiently elevated to cause rearrangement of the gamma-aminopropylmethylsiloxane units present in said hydrolyzate and recovering said cyclic gamma-aminopropylmethylsiloxanes as a distillate.

5. A process for preparing cyclic delta-aminobutylmethylsiloxanes which comprises heating a hydrolyzate of delta-aminobutylmethyldiethoxysilane comprising a mixture of ethoxy and hydroxy end-blocked delta-aminobutylmethylpolysiloxanes to a temperature sufficiently elevated to cause rearrangement of the delta-aminobutylmethylsiloxane units present in said hydrolyzate and recovering said cyclic delta-aminobutylmethylsiloxanes as a distillate.

References Cited in the file of this patent

UNITED STATES PATENTS

| | | |
|---|---|---|
| 2,415,389 | Hunter et al. | Feb. 4, 1947 |
| 2,455,999 | Hyde | Dec. 14, 1948 |
| 2,715,133 | Speier | Aug. 9, 1955 |
| 2,738,357 | Speier | Mar. 13, 1956 |
| 2,762,823 | Speier | Sept. 11, 1956 |
| 2,815,300 | Smith | Dec. 3, 1957 |

FOREIGN PATENTS

| | | |
|---|---|---|
| 1,065,545 | France | Jan. 13, 1954 |
| 1,116,196 | France | Jan. 30, 1956 |

OTHER REFERENCES

McGregor: "Silicones and Their Uses," McGraw-Hill Book Co., Inc., publishers, New York (1954), pp. 268–72.

Speier et al.: "Jour. Am. Chem. Soc.," vol. 78 (May 20, 1956), pp. 2278–81 and 2280–21 relied on.